J. CAMINITI.
DISPLAY DEVICE FOR ADVERTISING FRUIT JUICES.
APPLICATION FILED APR. 17, 1919.

1,333,386.

Patented Mar. 9, 1920.
3 SHEETS—SHEET 1.

WITNESSES

INVENTOR
Joseph Caminiti,
BY
ATTORNEYS

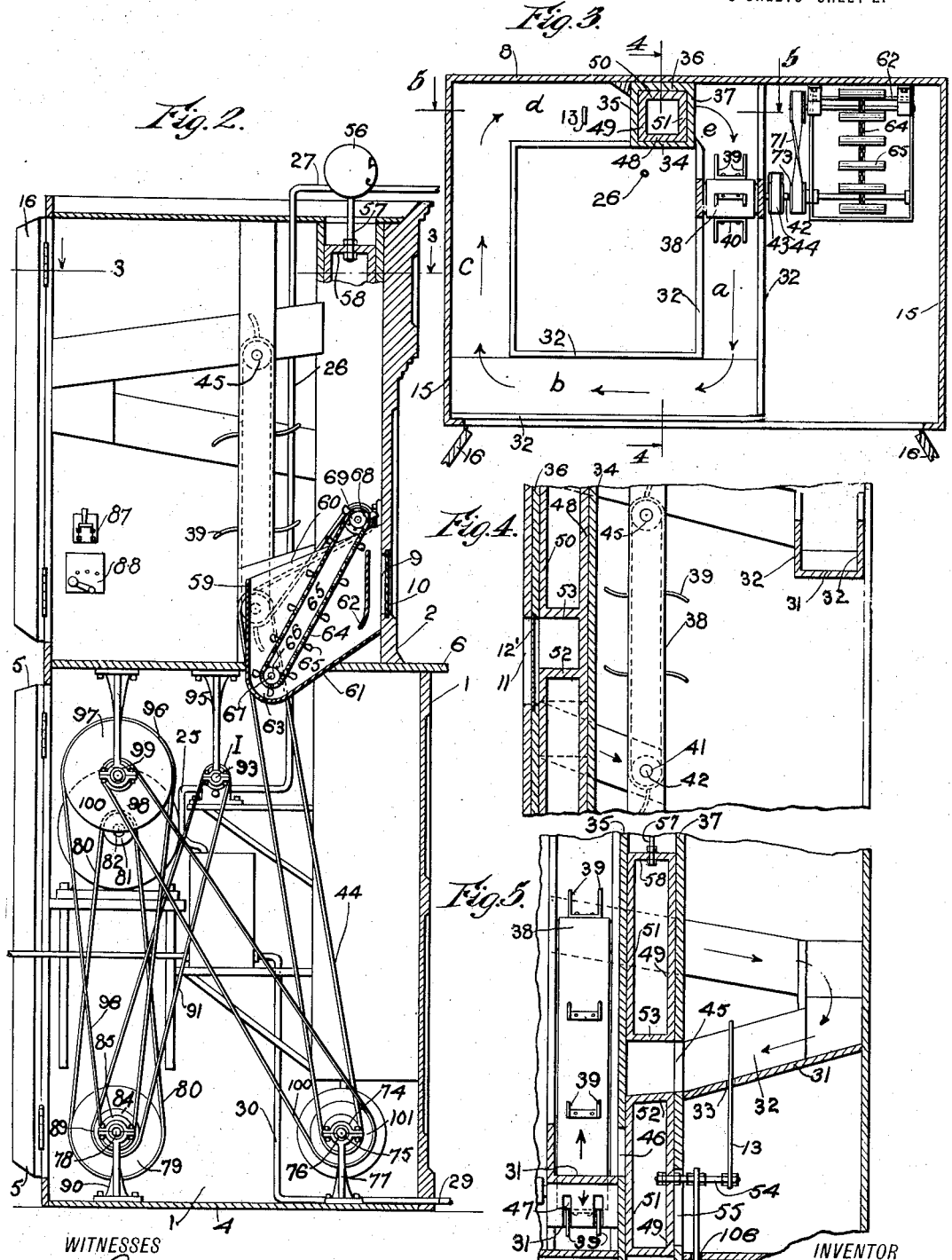

J. CAMINITI.
DISPLAY DEVICE FOR ADVERTISING FRUIT JUICES.
APPLICATION FILED APR. 17, 1919.
1,333,386.
Patented Mar. 9, 1920.
3 SHEETS—SHEET 3.
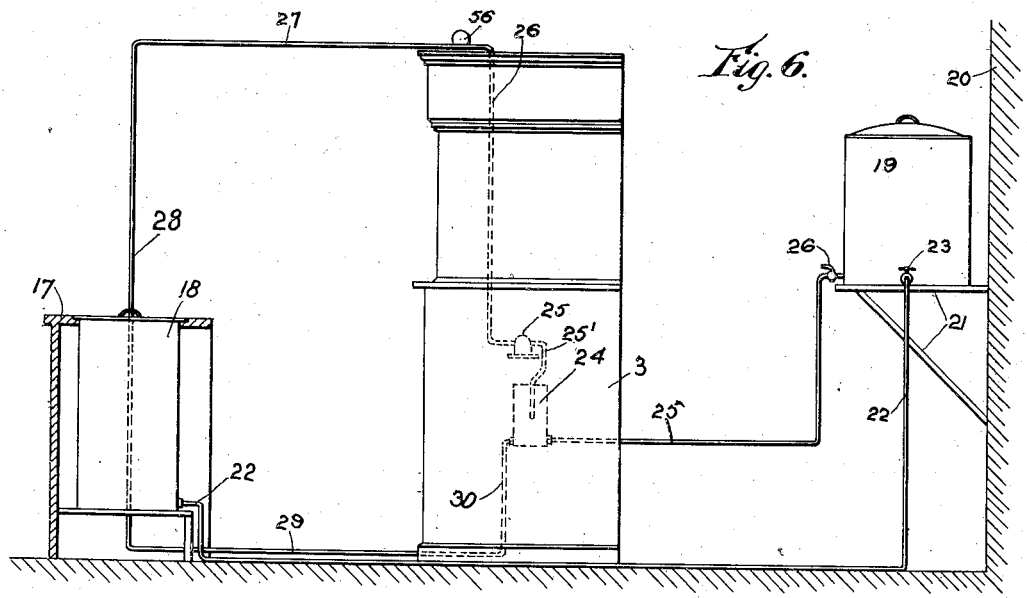
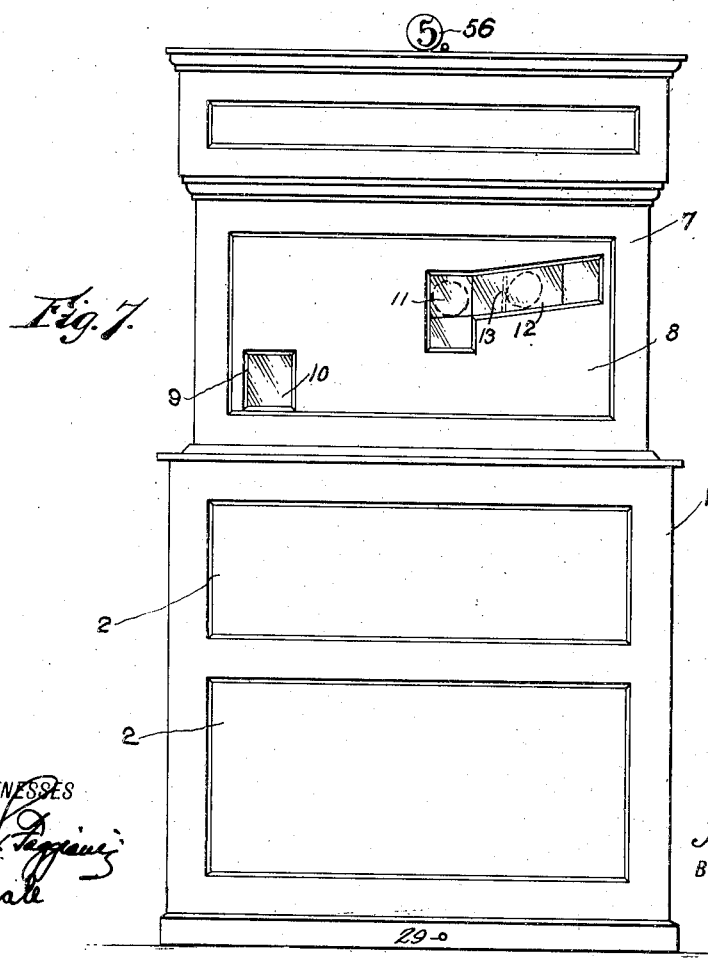
INVENTOR
Joseph Caminiti,
BY
ATTORNEYS

UNITED STATES PATENT OFFICE.

JOSEPH CAMINITI, OF BROOKLYN, NEW YORK.

DISPLAY DEVICE FOR ADVERTISING FRUIT-JUICES.

1,333,386.   Specification of Letters Patent.   Patented Mar. 9, 1920.

Application filed April 17, 1919. Serial No. 290,719.

*To all whom it may concern:*

Be it known that I, JOSEPH CAMINITI, a citizen of the United States, and a resident of the city of New York, Coney Island, borough of Brooklyn, in the county of Kings and State of New York, have invented a new and Improved Display Device for Advertising Fruit-Juices, of which the following is a full, clear, and exact description.

This invention relates to a new and improved display device to advertise and stimulate the sale of fruit juices as made from crushed fruit.

One of its objects is to provide a display device which will serve to visibly indicate or stimulate the method used in making the pure fruit beverages from the crushed fruit which are sold over the counter and in this way to remove the skepticism ofttimes in the mind of the purchasers as to the ingredients used in making beverages of this character.

A further object is to provide an advertising device which, by the visible motion of the parts, will serve to attract the attention of the public and act as a silent salesman in indicating the method of obtaining the fruit juices and at the same time announcing the price of the drink.

A further object is to provide an advertising device which, while serving to indicate the method of manufacture of the crushed fruit beverage and seemingly performing the indicated or suggested operation, in reality, has the parts so arranged that the same fruit and liquid may be used repeatedly to show the process without consumption or destruction of the natural fruit product.

Still a further object is to provide, in a display device for advertising the sale of beverages made from the juices of crushed fruits, a visible means to indicate the peeling of the fruit, coöperating with another means showing the crushing of the fruit, together with a transparent circulating pipe carrying the beverage adjacent to the simulated crushing and paring means, and in this manner to convey to the prospective purchasers, a realistic effect or impression of the actual method of maufacture of such beverages. By using a display device of this character which is continuously operated, great economy is effected in the use of the fruit because under ordinary conditions, if the natural fruit at the stand were continuously crushed and used to indicate the method of manufacture, the amount of the beverage obtained from the juice resulting from the crushed fruit would be out of all proportion to the probable demand therefor so, therefore, a certain portion of the fruit juice actually obtained from the crushed fruit is continually circulated through a tube having an exposed portion of transparent material and by providing a means for continuously utilizing and carrying by visible openings, respectively, fruit parings or peelings, and the natural fruit.

A further object is to provide in a device of this character, a means which will automatically operate to permit but one fruit to be fed to the crusher at any one time.

Other objects and advantages of this invention will be apparent from the accompanying drawings and the following description.

Similar characters of reference designate corresponding parts in the several views.

In the drawings showing one of the preferred forms of this invention, Figure 1 is an elevation view of the device showing the arrangement of the various parts as carried in a cabinet with the doors open.

Fig. 2 is a sectional side elevation view showing the relative arrangement of the parts.

Fig. 3 is a plan sectional view taken upon the line 3—3 of Fig. 2.

Fig. 4 is a broken sectional elevation view taken on the line 4—4 of Fig. 3.

Fig. 5 is a broken sectional elevation view taken on the line 5—5 of Fig. 3 showing the operation of the plunger and shut-off arm, the inclined chutes and the fruit elevating conveyer.

Fig. 6 is a view showing the general arrangement of the display advertising device with respect to the selling stand and the various beverage receptacles and piping therebetween.

Fig. 7 is a view of the cabinet carrying the operating mechanism and showing only the visible openings in the machine and the price indicating sign.

Figure 1:
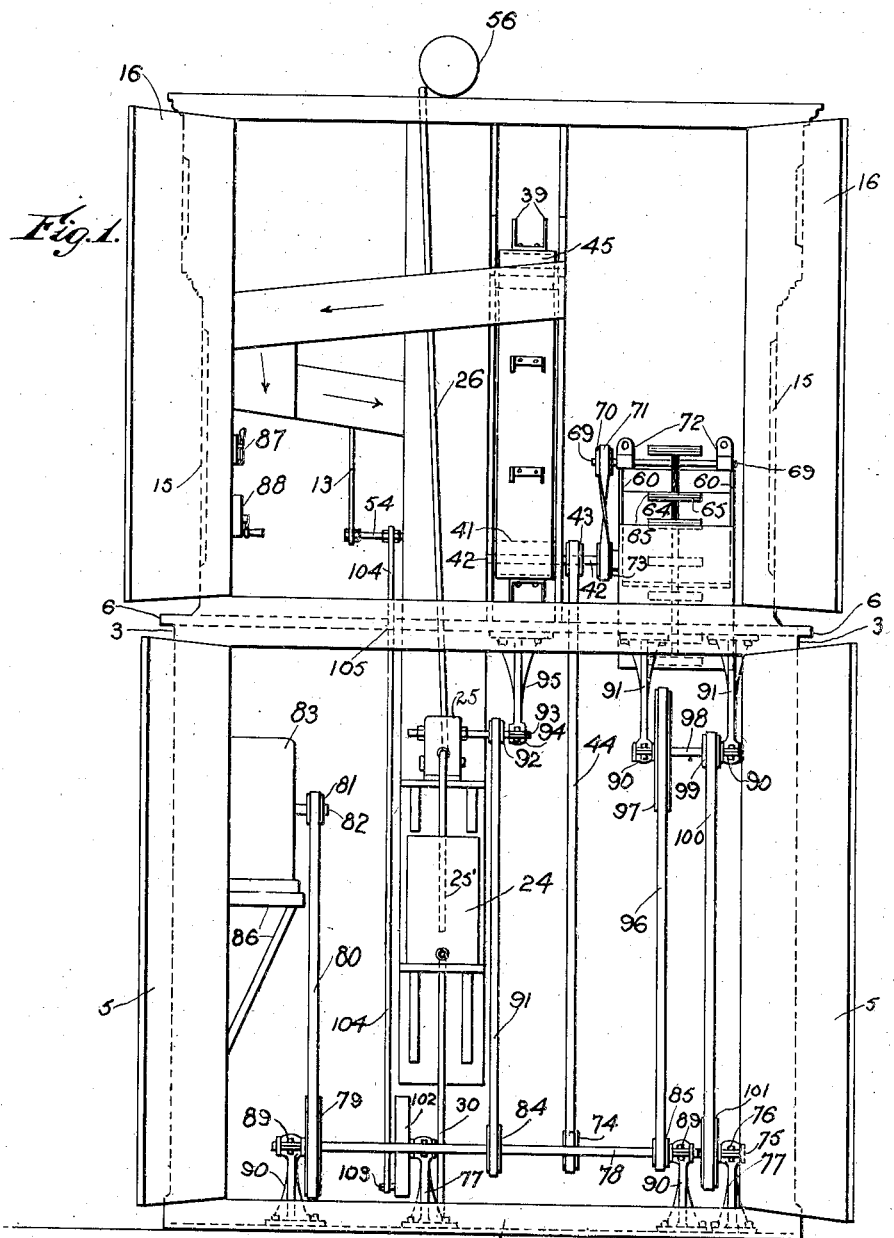

In the drawings showing one of the preferred forms of the invention, there is provided as a means of housing the operating mechanism, a cabinet having a lower portion or compartment 1 comprising front panel members 2, sides 3, a base or bottom 4 and door members 5 hinged at the sides 3 so that access may be had to the mechanism carried in the interior of the lower portion of the cabinet.

A separating or partition member 6 is carried at the top of the lower portion of the cabinet and separates it from the upper portion of the cabinet, which comprises a front 7 having a panel member 8 which has at one of the lower corners therein an opening 9 having a suitable transparent covering 10 therfor so that there may be seen therethrough the falling of crushed fruit parings or skins and pulp which are caused to pass said opening by means hereinafter to be described.

Spaced from the opening in said panel there is another opening shown as comprising a square portion 11 and an inclined rectangular opening 12 extending therefrom, these being also covered by a suitable transparent material 12'. The inclined rectangular portion 12 of the latter opening acts as a trough or chute to receive the natural fruit as delivered thereto by suitable means hereinafter to be described and they are seen to pass into the end portion 11 and are carried downwardly, they being seemingly crushed or pressed by a descending plunger which is vertically reciprocated past said opening by suitable mechanism hereinafter to be described. A reciprocating cut-off member 13 is also seen through the opening 12 which functions to permit the delivery of but one fruit to the pressing means at any one time.

Above the cabinet is a sign 56 which is moved periodically by means hereinafter to be described to attract the attention of the prospective purchasers and announce to them the price of the beverage. There is also provided for the upper portion of the cabinet suitable side members 15 and doors 16 hinged to the rear part of said side members to close the back part and to permit access, when desired, to the mechanism inside of the upper portion of the cabinet.

In use the cabinet with its mechanism therein will preferably be spaced from a suitable counter or stand 17 holding a suitable receptacle 18 holding the fruit juice drink or beverage which is to be sold. However, the main supply of the fruit juice beverage will be carried in another tank 19 shown as supported at a higher level than the tank 18 on a wall 20 by a suitable supporting bracket 21 and connected with the serving receptacle 18 by a suitable pipe connection 22, which may be provided with a valve 23, so that the contents of tank 19 will flow by gravity to the receptacle 18. Within the lower part of the cabinet is a supplementary tank 24, located at a lower level than tank 19 to receive beverage therefrom by gravity flow through a pipe connection 25 provided with a suitable valve 26.

As previously stated, it would not be desirable to have the demonstrating or display device to crush the natural fruit continuously, so there is provided the supplementary tank 24, the supply from which is continuously circulated by a suitable circulating pump 25 connected therewith by a tube 25', through the tubing or pipe 26 extending through the cabinet and to the top thereof, through the pipe 27 carried to a point over the serving counter, and down through the pipe 28 through the serving receptacle, the latter lengths of tubing 27 and 28 being made of a suitable transparent material, preferably glass, so that the beverage may be seen circulating therethrough. The beverage is returned to the supplementary tank 24 from the tubing 28 by the tubing 29 and 30. It is thus seen that by means of the supplementary tank, tubing and pump, a continuous circulation of a portion of the beverage actually sold is exhibited to the customer.

In the upper part of the cabinet there is provided as a means of conducting or carrying the natural fruit past the inclined rectangular opening visible from the front of the cabinet, an inclined trough or chute having an inclined bottom 31 and spaced side portions 32. For a certain length of the trough the side 15 and the front transparent covering 12' function as one of the spaced side portions for the trough. A suitable slot or opening 33 is made in one part of the bottom of the trough 31, spaced from the lower end of the trough a sufficient distance to accommodate a natural fruit, to receive the reciprocating cut-off arm 13.

It is to be noted that in the preferred structure shown the inclined trough has five connecting inclined portions extending in the form of a square as shown in Fig. 3 at $a$, $b$, $c$, $d$ and $e$, extending around in a spiral form. Fruit is delivered to the highest point of the trough as at $a$ by a suitable elevating conveyer comprising a continuously rotating belt 38, outwardly and upwardly projecting arms 39 and connecting base member 40 suitably secured to the belt 38 which is continuously guided over rollers 41 and 45, the former being mounted on a shaft 42 and driven through a pulley 43 and belt connection 44. From the highest point $a$ of the trough the natural fruit is carried by gravity around the chute in the path indicated by arrows and is stopped by the shut-off arm 13 when in a raised position.

A box-like shaft comprising the members 34, 35, 36 and 37 is constructed in the upper part of the cabinet to the rear of and in alinement with the opening 11 of the panel and extends vertically for substantially the entire height of the upper portion of the cabinet. There is provided in one side 37 of the shaft adjacent to the portion $d$ of the inclined trough, an opening 45 (see Fig. 5) communicating and in alinement with the lower end of this portion of the trough. In the opposite side 35 of the shaft and at a lower point than the opening 45, there is provided another opening 46 (see Fig. 5) which communicates and is in alinement with the upper end of the portion with the part $e$ of the inclined trough which extends from the above point down to a point adjacent the lower part of the elevating conveyer or belt. At the lower end of the bottom 31 of the $e$ portion of the inclined trough there are provided slots 47 to receive the projecting arm portions 39 of the fruit supporting members so that when the natural fruit is carried by gravity to the lower end of the $e$ section of the inclined trough, it strikes the elevating conveyer belt 38 and there remains until one of the fruit supporting members carried by the belt comes in contact with the fruit when the fruit will be carried or conveyed from the lower portion of the $e$ section of the trough up to the highest point of the $a$ section of the inclined trough where the fruit will be discharged and will then be carried by gravity and guided by the trough to the shaft opening 45. Within the shaft structure there is a reciprocating plunger or piston comprising the members 48, 49, 50 and 51 suitably arranged and connected to be guided within the shaft. Said plunger is provided with a pocket having openings on three adjacent sides at the same portion of the plunger so that when at its upper limit of travel, an opening in one side 49 will be in alinement and communicating with the opening 45 in the side 37 of the shaft and with the lower end of the $d$ portion of the inclined trough, thus permitting a natural fruit to roll within the shaft and against the side 35 thereof and to be supported or held on an inclined seat 52 of the plunger which is in alinement with the bottom 31 of the $d$ section of the inclined trough. An adjacent opening in the front part of the plunger is in alinement with the opening 11 in the panel and permits the fruit to be seen therethrough. As the plunger descends it carries the fruit therewith and the fruit and the top 53 of the opening in the plunger is seen to travel downward past the opening 11, thus producing an effect in which the fruit is seemingly crushed by the descending plunger. When the plunger reaches its lower limit of travel which may be a distance equal substantially to the height of the plunger opening, an opening in the side 51 of the plunger will be in alinement, and communicating, with the opening 46 in the side 35 of the shaft, and the upper part of the $e$ section of the inclined trough, and, due to the inclined seat 52 in the plunger, the fruit will be delivered by gravity to the $e$ section of the trough and thence to the elevating conveyer.

As a means of obtaining a proper reciprocating movement of the cut-off member 13 with relation to the plunger movement, the lower portion of said cut-off member is suitably secured to one side 49 of the plunger by a connecting member 54 extending through a slot 55 in the side 37 of the shaft, said slot being of sufficient length to permit the reciprocating movement of the cut-off arm 13, this movement being sufficient to permit the top of the cut-off member 13 to descend with the plunger a sufficient distance to permit a fruit to gravitate past the withdrawn cut-off arm to the other side thereof, which fruit will be stopped by the side 49 of the descended plunger or piston. When the plunger and cut-off arm are again raised, the fruit which has passed the arm will gravitate through the opening 45 to the opening within the plunger, and the cut-off arm in rising will prevent other fruit at this time from descending until the cycle of operations has been completed.

It is to be understood, however, that there is herein shown but one preferred construction for obtaining the effect of seemingly crushing the fruit and that other suitable means may be utilized for this purpose.

There is provided as a means to arrest and attract the attention of the public and to announce the price of the beverage, a reciprocating sign shown in the drawing as comprising a spherical-shaped member 56, displaying the price of the beverage, supported by a rod 57 having its lower end suitably secured to the top 58 of the reciprocating plunger, the rod 57 being of such length that when the plunger is at its upper limit of travel, the sign will be visible, but when the plunger descends, the sign will momentarily be withdrawn from view.

Within the cabinet and behind the opening 9 there is provided a receptacle 59, having sides 60 and preferably an inclined bottom portion 61 extending forward to the front panel, to hold and receive fruit peelings, parings or pulp. Spaced behind the opening 9 and spaced therefrom within the receptacle is a guiding partition 62. As a means of conveying the fruit peelings, parings or pulp from the lower end 63 of the receptacle to a point above the opening 9 where they may be discharged and fall by gravity past the opening 9 and the guiding partition 62, there is provided an endless belt or link member 64 having troughs or pockets 65 suitably secured thereto at spaced intervals, said endless member 64 being carried in the lower end 63 of the receptacle on a toothed roller member 66 carried on a shaft 67 supported in suitable bearings. Another guiding toothed roller member 68 is carried by a shaft 69 and driven by a pulley 70 and a belt connection 71 thereon. The shaft 69 is carried in suitable bearing blocks 72 at a point above the opening 9 in the panel 8. The toothed roller member 68 functions as a drive member and guide for the endless member 64 so that when a roller 68 is driven, the troughs or pockets 65 will successively be carried around the lower roller member 66, there to be filled with the fruit parings or pulp, then to be carried up to the roller 68 where the troughs or pockets will discharge their contents which will fall downward past the opening 9 and partition 62 so that as the parings descend they may be seen through the transparent covering 10 of the opening.

From the pulley 70 the belt 71 is crossed and carried over another pulley member 73 carried on the shaft 42, the reason for the crossing of the belt being to obtain the proper relative movement of the endless elevating conveyer 41 and the endless member 64 which are driven by the belt member 44 common to each. The belt 44 travels over another pulley 74 carried on a shaft 75 supported in bearings 76 on suitable brackets 77. The said shaft 75 is driven from a main power shaft 78, said power shaft having mounted thereon other drive pulleys 79, 84 and 85. The pulley 79 is connected by a belt 80 to another pulley 81 fixed on the shaft 82 of a main driving member 83 herein shown as an electric motor supported by a suitable bracket member 86. It is understood, however, that any other suitable driving means may be used to furnish the power. The usual seat 87 and starting box 88 are provided for the electric motor 83. The main drive pulleys are fixed on the main power shaft which is supported in bearings 89 carried by brackets 90 fixed to the bottom 4 of the cabinet.

The circulating pump 25 is driven by the pulley 84 through the belt 91 and pulley 92, said pulley being mounted on a shaft 93 carried in a bearing 94 supported by the bracket 95 fixed to the partitioning member 6.

The main drive connection for the pulley 74, which drives through the belt 44, the fruit elevating conveyer and the fruit paring conveyer, is made through the pulley 85, carried by the main power shaft 78, belt connection 96 to another pulley 97 carried on a counter shaft 98 supported in bearings 90 by brackets 91 fixed to the partitioning member 6. The counter shaft 98 has mounted thereon a smaller pulley 99 driving a belt 100, which in turn drives a pulley 101 fixed on the shaft 75, which also has mounted thereon the pulley 74 which drives the belt 44, and a disk 102 having projecting from its side near the periphery thereof a pin 103 which engages one end of a connecting rod 104, the other end of said rod 104 extending through a slotted opening 105 of the partition 6 and operatively engages the rod 54. The reciprocating motion of the plunger and the cut-off rod is thus obtained at the upper end of the connecting rod 104 from the rotary movement at the lower end of said rod.

It is understood that the relative speeds of the various members of this apparatus may be changed by employing various size pulleys in their respective positions. This, however, is a feature which a mechanic skilled in the art could ascertain. Further, the speed of the entire outfit may be changed by varying the speed of the main driving motor. Other adjustments of the coöperating parts may be made in order to obtain the most realistic effect of the display device.

In the present instance it has proved satisfactory to so adjust and proportion the parts as to permit the passage of about twenty-four fruits per minute by the opening 11 in the panel member.

It is to be further understood that this device is not limited to the use of any particular kind of fruit, being adapted to use any desired fruit, for example, such as oranges, lemons, apples, peaches, etc.

It is thus seen that this display device for advertising beverages of crushed fruit juices accomplishes its object in a most effective manner by simple automatic means and serves to indicate to the public the method of manufacturing and producing the fruit juices used in the beverage. This is done by visible means in motion indicating to the prospective customer the natural fruit, the paring and crushing of the natural fruit and the flowing juices resulting therefrom.

It is to be understood that the display device is not to be limited to the particular cabinet or the panel member or the positioning of the openings therein, the essential feature being the means of obtaining the realistic effect depicting the process of manufacture in which there is visibly presented in motion the suggestive crushing and peeling or paring operation.

This device is not to be limited to the construction shown, for certain modifications and changes thereof may be made without departing from the spirit and scope of this invention.

I claim:

1. A display device for advertising fruit juices comprising visible means in motion to indicate the crushing of the natural fruit and visible means in motion to indicate the paring of fruit.

2. A method of advertising fruit juices comprising means visible and in motion to simulate the crushing of the natural fruit and adjacent thereto a visible means in motion suggestive of the paring of the natural fruit.

3. A display device for advertising fruit juice beverages comprising means visible and in motion to simulate the crushing operation of the natural fruit and coöperating therewith a means visible and in motion to indicate the paring of the natural fruit, said first-named means including an opening, an inclined trough adapted to receive the natural fruit, said trough and fruit being visible through said opening, and a reciprocating plunger having a pocket thereon adapted to be in alinement with the lower end of said inclined trough when at one limit of travel and to receive the natural fruit from said trough, the pocket in said plunger being also visible through said first-named opening, said coöperating means for indicating the paring of the natural fruit including a second opening adjacent to the first-named opening, a receptacle therebehind adapted to hold fruit peelings and parings and a conveying means for carrying said fruit parings above the opening and there discharging same so as to be carried past said second-named opening.

4. In an advertising display device for crushed fruit juices, a panel member, a plurality of openings therein, transparent cover for said openings, means in motion visible through one of said openings to simulate the crushing of natural fruit and means in motion visible through another one of said openings to indicate the paring of natural fruit, said first-named means including a plunger, a fruit holding pocket therein, a fruit carrying inclined trough leading to said pocket, the fruit in said trough and plunger pocket being visible through said opening and means for reciprocating said plunger.

5. In an advertising display device for crushed fruit juices, a panel member, a plurality of openings therein, transparent cover for said openings, means in motion visible through one of said openings to simulate the crushing of natural fruit and means in motion visible through another one of said openings to indicate the paring of natural fruit, said first-named means including a plunger, a fruit holding pocket therein, a fruit carrying inclined trough leading to said pocket, the fruit in said trough and plunger pocket being visible through said opening and a cut-off device to control the flow of the fruit to the plunger pocket.

6. In an advertising display device for crushed fruit juices, a panel member, a plurality of openings therein, transparent cover for said openings, means in motion visible through one of said openings to simulate the crushing of natural fruit and means in motion visible through another one of said openings to indicate the paring of natural fruit, said means in motion visible through the other opening to indicate the paring of fruit including a receptacle and a conveyer to hold fruit peelings or parings, and a conveying means for carrying said fruit parings to a point above the opening and there discharge same so that they may pass said opening.

7. In a display device, a panel member, a plurality of spaced openings therein, means including a vertically reciprocating plunger for moving natural fruit past one of said openings and means including an inclined conveyer having pockets therein for carrying fruit pulp above the other opening to be there discharged to fall by gravity in front of the other opening.

8. In a display device for advertising the sale of fruit juices, a panel member, an opening therein, an inclined trough leading to said opening, a plunger having an opening therein leading to said trough and arranged to receive fruit and convey same past the opening in said panel, another inclined trough at a lower level than said first inclined trough and communicating with the opening in said plunger and a conveying means between said two inclined troughs for carrying the fruit therebetween.

9. A display device for advertising fruit juices comprising a cabinet, a front panel therefor, an inclined trough behind said panel adapted to receive a natural fruit, a vertical shaft at the lower end of said trough, a portion of said trough and shaft being visible, a plunger for said shaft having a pocket therein to receive fruit from said trough, means for moving said fruit by the opening in said panel, another opening in said panel, a receptacle therebehind adapted to hold the skins and pulp of crushed fruit and a means for carrying said skins and pulp of crushed fruit by said last-named opening.

10. In a display device for advertising fruit juices, visible means to simulate the crushing of the whole fruit, said means including a panel, an opening therein, an inclined trough visible through said opening, a shaft at the lower end of said trough and communicating therewith also visible through said opening, a plunger for said shaft having a pocket therein to receive fruit from the lower end of said trough, means for reciprocating the plunger in said shaft and a conveying means below the shaft opening to receive the fruit from the plunger and carry to said first-mentioned inclined trough.

11. A display device for advertising fruit juices comprising means to visibly indicate the peeling of fruit, said means including an opening, a receptacle adjacent thereto adapted to hold fruit pulp and peelings and a means for said receptacle to carry the peelings and pulp from said receptacle to a point above said opening there to be discharged so that in again returning to the receptacle they will pass said opening to produce from the opposite side of the opening the effect of peeling and crushing of fruit, and a means to simulate the crushing of fruit, said means including an inclined trough, a plunger having a pocket at the lower end of said trough, means for reciprocating the plunger, said inclined trough and pocket in said plunger being visible so that when the plunger carrying the fruit in the pocket is depressed said fruit is apparently crushed by the descending plunger, and a means for conveying the fruit from the plunger back to the inclined trough.

12. A display device for advertising fruit juices comprising visible means to simulate the crushing of a fruit, said means including an opening, a plunger adjacent thereto and means for reciprocating said plunger behind said opening.

13. In a display device for advertising the sale of crushed fruits comprising in combination visible means in motion to indicate the crushing of fruit, visible means in motion suggestive of the peeling and paring of fruit and a transparent tube adjacent said means adapted to carry the fruit juices therethrough.

14. In a display device for advertising fruit juices, visible means in motion to simulate the crushing of the natural fruit, said means including a reciprocating member, and a cut-off means for automatically controlling the feed of the fruit to said reciprocating member.

15. In a device of the character described, an inclined trough, a shaft having an opening communicating therewith, a plunger in said shaft, a means for reciprocating said plunger past said opening, means below said first-named opening to receive the fruit from the plunger and a conveying means communicating therewith to return the fruit to said inclined trough.

16. In a device of the character described for suggesting the process of making fruit juice beverages, visible means suggesting a fruit crushing operation and visible means adjacent thereto suggesting the peeling operation.

17. In a display device of the character described for advertising fruit juices, a panel having a plurality of openings therein, an elevating conveyer adapted to carry natural fruit passed to one of said openings, another conveyer adapted to carry fruit peelings or pulp past or in front of another one of the openings and a common drive member for driving said conveyers.

18. In a display device of the character described, for advertising fruit juices, a main storage tank, a display cabinet adjacent thereto suggesting a fruit crushing operation, a supplementary tank for said cabinet located at a lower level than said main tank, a pipe connection between said tanks and a valve therefor, another serving receptacle adjacent said cabinet also at a lower level than said main tank, a pipe connection having a valve therein between said serving receptacle and said main tank, a circulating pump for said supplementary tank and a circulating pipe system connecting said pump with said supplementary tank to permit continuous circulation of the contents thereof, a portion of said circulating piping system being transparent and extending through the serving receptacle so that the circulating liquid may be seen therethrough.

JOSEPH CAMINITI.